US012785380B2

(12) United States Patent
Tiwari et al.

(10) Patent No.: US 12,785,380 B2
(45) Date of Patent: Nov. 3, 2026

(54) DUAL-INPUT BUS ARCHITECTURE

(71) Applicant: The Boeing Company, Arlington, VA (US)

(72) Inventors: Nidhi Tiwari, Bangalore (IN); Rajeev Ranjan, Bangalore (IN); Nishanth Beedu, Bangalore (IN); Animesh Mukherjee, Bangalore (IN); Vani Shishodia, Ghaziabad (IN)

(73) Assignee: The Boeing Company, Arlington, VA (US)

(*) Notice: Subject to any disclaimer, the term of this patent is extended or adjusted under 35 U.S.C. 154(b) by 345 days.

(21) Appl. No.: 18/522,988

(22) Filed: Nov. 29, 2023

(65) Prior Publication Data

US 2025/0175078 A1 May 29, 2025

(51) Int. Cl.

| | |
|---|---|
| ***H02H 3/18*** | (2006.01) |
| ***H02H 3/087*** | (2006.01) |
| ***H02J 1/082*** | (2026.01) |
| ***H02J 9/06*** | (2006.01) |

(52) U.S. Cl.

CPC .............. *H02H 3/18* (2013.01); *H02H 3/087* (2013.01); *H02J 1/082* (2020.01); *H02J 9/06* (2013.01)

(58) Field of Classification Search

CPC ............ H02H 3/18; H02H 3/087; H02H 3/20; H02H 3/202; H02H 3/081; H02H 7/18

See application file for complete search history.

(56) References Cited

U.S. PATENT DOCUMENTS

2012/0293017 A1* 11/2012 Lidsky .................. H02H 3/202 307/130
2014/0029152 A1* 1/2014 Mazzola ............ H03K 17/6871 361/115

* cited by examiner

*Primary Examiner* — Alex Torres-Rivera
(74) *Attorney, Agent, or Firm* — Harrity & Harrity, LLP

(57) ABSTRACT

An apparatus includes a first input power bus having a first input terminal coupled to a first input power source, a first output terminal, and a first group of line diodes between the first input terminal and the first output terminal. The apparatus also includes a second input power bus having a second input terminal coupled to a second input power source, a second output terminal coupled to the first output terminal of the first input power bus, and a second group of line diodes between the second input terminal and the second output terminal. The first output terminal and the second output terminal are coupled to provide power to a load.

20 Claims, 14 Drawing Sheets

DUAL-INPUT BUS ARCHITECTURE

FIELD

The present disclosure generally relates to power busses, and more particularly, to a dual-input power bus.

BACKGROUND

This background description is provided for the purpose of generally presenting the context of the disclosure. Unless otherwise indicated herein, material described in this section is neither expressly nor impliedly admitted to be prior art to the present disclosure or the appended claims.

It is imperative that particular electronic hardware components integrated into an aircraft receive power during operation of the aircraft. As such, aircraft safety standards often require that certain electronic hardware components have a redundant input power source to ensure that power is adequately provided to the electronic hardware.

A typical redundant input power source includes a first power bus having a first diode coupled to an input of a load (e.g., an isolated converter) and a second power bus having a second diode coupled to the input of the load. In particular, the input to the load for a typical redundant input power source is coupled to a cathode of the first diode and coupled to a cathode of the second diode. However, a single failure (or multiple failures) on the input of the load may cause an increase in load current on both input busses. For example, failure of any line diodes (e.g., the first diode or the second diode) on the power busses can lead to both of the power busses shorting due to an absence of reverse voltage protection.

SUMMARY

The present application is directed to an improved dual-input bus architecture. In particular, according to the techniques described herein, the dual-input bus architecture is a redundant input power source that provides adequate power to a load (e.g., a converter) under a variety of operating scenarios (e.g., component failures or shortages). For example, the dual-input bus architecture includes a first input power bus that couples the load to a first power source and a second input power bus that couples the load to a second power source. Each input power bus includes a group of line diodes coupled between the respective power source and the load. For example, according to one implementation, the first input power bus includes three line diodes coupled between the first power source and the load, and the second input power bus include three line diodes coupled between the second power source and the load. The configuration of the first input power bus is similar to the configuration of the second input power bus. Thus, for ease of description, the following summary describes the configuration of the first input power bus.

A cathode of an input line diode on the first input power bus is coupled to the first power source. As used herein, an "input line diode" or an "input diode" corresponds to the diode on a particular input power bus that is closest to the power source. An input switch (e.g., a metal-oxide-semiconductor-field-effect transistor (MOSFET)) associated with the input line diode is controllable by an input controller. The input controller is configured to provide inrush current protection to the load. For example, in response to detecting an overvoltage or overcurrent, the input controller can deactivate the input switch.

A cathode of an output line diode on the first input power bus is coupled to the load. As used herein, an "output line diode" or an "output diode" corresponds to the diode on a particular input power bus that is closest to the load (e.g., the direct current (DC) converter). An output switch associated with the output line diode is controllable by an output controller. The output controller is configured to provide reverse current protection to the first input power bus. For example, the output controller is configured to deactivate the output switch in response to detecting a reverse voltage. That is, current from the second input power bus is prevented from flowing through the first input power bus by the deactivating the output switch. According to some implementations, to improve efficiency, the output switch and the output line diode can be integrated into a MOSFET ideal diode circuit.

A middle line diode (between the input and output line diodes) has a similar configuration as the output line diode. In particular, a cathode of the middle line diode on the first input power bus is coupled to an anode of the output line diode on the first power bus, and an anode of the middle line diode is coupled to the anode of the input line diode. Thus, the output and middle diodes have similar orientations, and the input diode has an orientation that is opposite the orientation of the output and middle diodes. As used herein, a "middle line diode" or a "middle diode" corresponds to the diode between the input diode and the output diode.

A middle switch associated with the middle line diode is controllable by a middle controller. The middle controller is configured to provide additional reverse current protection to the first input power bus. For example, the middle controller is configured to deactivate the middle switch in response to detecting a reverse voltage. That is, current from the second input power bus is prevented from flowing through the first input power bus by the deactivating the middle switch. To improve efficiency, the middle switch and the middle line diode can also be integrated into a MOSFET ideal diode circuit.

Thus, the input controller is configured to activate the first switch in response to detecting a forward voltage caused by the first power source. As a result, current flows through the first input power bus to the load. However, if the second power source associated with the second input power bus provides a greater voltage than the first power source associated with the first input power bus, the middle and output controllers deactivate the middle and output switches, respectively, to prevent a reverse current from flowing through the first input power bus. Additionally, because of the orientation of the middle and output diodes, a reverse current is prevented from flowing through the middle and output diodes.

As described herein, it should be appreciated that the load is provided with current (e.g., power) in different operating scenarios. For example, when line diodes of the first input power bus or line diodes of the second input power bus are shorted (e.g., fail), the dual-input bus architecture has built-in safeguards that ensure the load is provided with adequate current and ensure that both input power busses are not shorted.

In one aspect, the present application discloses an apparatus. The apparatus includes a first input power bus having a first input terminal coupled to a first input power source, a first output terminal, and a first group of line diodes between the first input terminal and the first output terminal. The first group of line diodes includes a first input diode having a cathode coupled to the first input terminal. A first input switch associated with the first input diode is controllable by a first input controller that senses a voltage across the first input diode. The first group of line diodes also includes a first output diode having a cathode coupled to the first output terminal. A first output switch associated with the first output diode is controllable by a first output controller that senses a voltage across the first output diode. The apparatus also includes a second input power bus having a second input terminal coupled to a second input power source, a second output terminal coupled to the first output terminal of the first input power bus, and a second group of line diodes between the second input terminal and the second output terminal. The first output terminal and the second output terminal are coupled to provide power to a load.

In another aspect, the present application discloses an aircraft. The aircraft includes a load and a dual-input bus. The dual-input bus includes a first input power bus having a first input terminal coupled to a first input power source, a first output terminal, and a first group of line diodes between the first input terminal and the first output terminal. The first group of line diodes includes a first input diode having a cathode coupled to the first input terminal. A first input switch associated with the first input diode is controllable by a first input controller that senses a voltage across the first input diode. The first group of line diodes also includes a first output diode having a cathode coupled to the first output terminal. A first output switch associated with the first output diode is controllable by a first output controller that senses a voltage across the first output diode. The dual-input bus also includes a second input power bus having a second input terminal coupled to a second input power source, a second output terminal coupled to the first output terminal of the first input power bus, and a second group of line diodes between the second input terminal and the second output terminal. The first output terminal and the second output terminal are coupled to provide power to the load.

In another aspect, the present application discloses a method. The method includes applying power to a load via a first input power bus and based on a first input power source. The first input power bus has a first input terminal coupled to the first input power source, a first output terminal, and a first group of line diodes between the first input terminal and the first output terminal. The first group of line diodes includes a first input diode having a cathode coupled to the first input terminal. A first input switch associated with the first input diode is controllable by a first input controller that senses a voltage across the first input diode. The first group of line diodes also includes a first output diode having a cathode coupled to the first output terminal. A first output switch associated with the first output diode is controllable by a first output controller that senses a voltage across the first output diode. The method also includes applying power to the load via a second input power bus and based on a second input power source. The second input power bus has a second input terminal coupled to a second input power source, a second output terminal coupled to the first output terminal of the first input power bus, and a second group of line diodes between the second input terminal and the second output terminal. The first output terminal and the second output terminal are coupled to provide power to the load.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
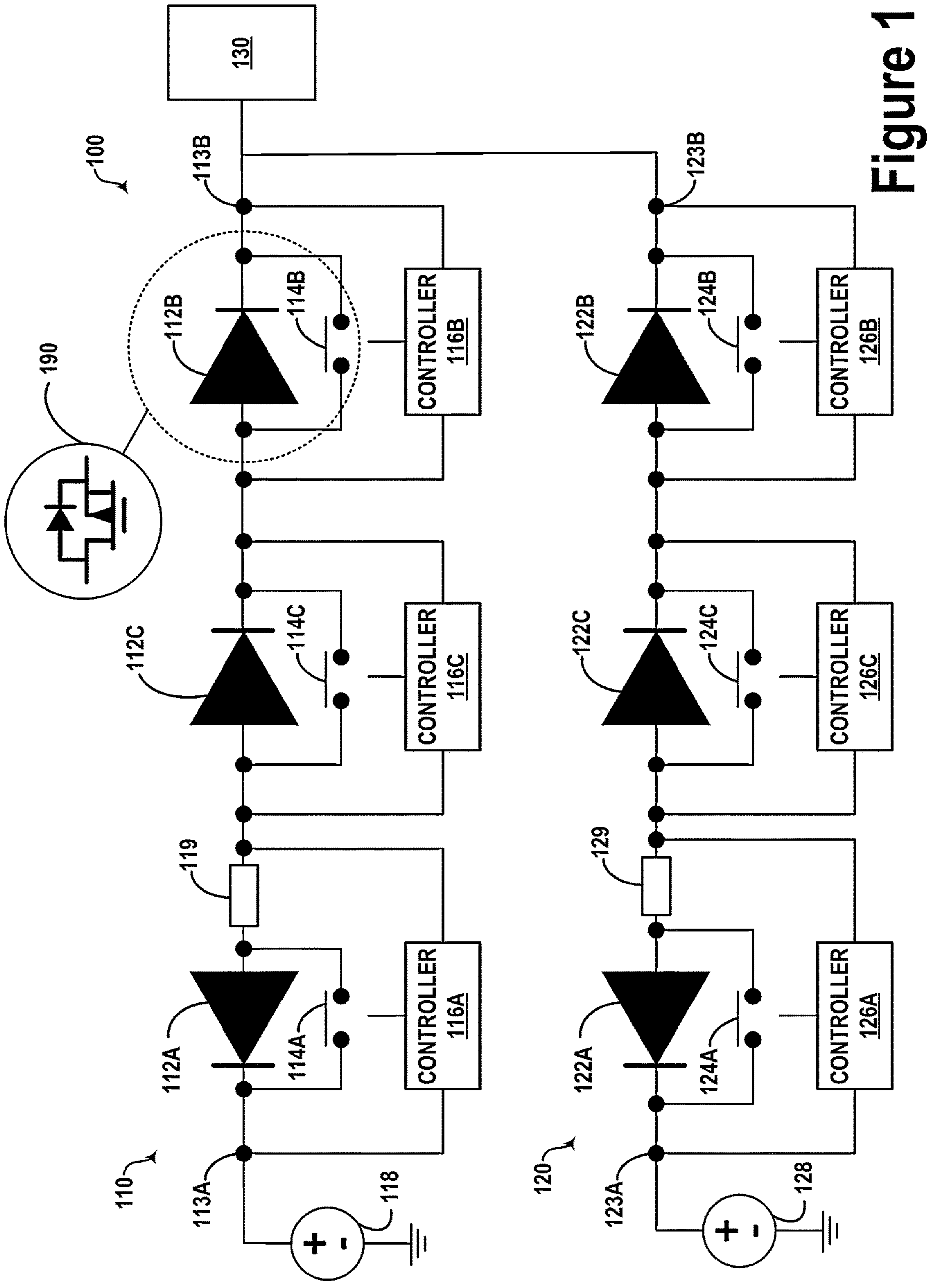
FIG. 1 illustrates a dual-input bus that provides power to a load, according to an exemplary embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number.

When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, controllers are illustrated and associated with reference number 116. When referring to a particular one of the controllers, such as the controller 116A, the distinguishing letter "A" is used. However, when referring to any arbitrary one of the controllers or to the controllers as a group, the reference number 116 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring to FIG. 1, a dual-input bus 100 that provides power to a load is illustrated, in accordance with an exemplary embodiment. For example, the dual-input bus 100 (e.g., a dual-input power bus) includes a first input power bus 110 (e.g., a direct current (DC) power bus) and a second input power bus 120 (e.g., a DC power bus). As described below with respect to FIGS. 2-12, the dual-input bus 100 provides a redundant dual-input power bus architecture that ensures adequate power is supplied to a load 130 under a plurality of different operating scenarios. For example, the architecture of the dual-input bus 100 provides for physical and electrical isolation between power inputs to ensure that an adequate power signal (e.g., a current signal) is provided to the load 130 if different line diodes fail (e.g., short). In some scenarios, the load 130 corresponds to a converter circuit (e.g., a DC-DC converter) of a power supply that supplies power to electronic hardware components of an aircraft.

The first input power bus 110 includes a first input terminal 113A and a first output terminal 113B. The first input terminal 113A is coupled to a first input power source 118. The first input power source 118 is configured to provide a power signal (e.g., a current signal) across the first input power bus 110 to the load 130. The load 130 is coupled to the first output terminal 113B of the first input power bus 110 and to a second output terminal 123B of the second input power bus 120.

The first input power bus 110 also includes a first group of line diodes 112 between the first input terminal 113A and the first output terminal 113B. The first group of line diodes includes a first input diode 112A, a first output diode 112B, and a first middle diode 112C. A cathode of the first input diode 112A is coupled to the first input terminal 113A, and an anode of the first input diode 112A is coupled to an anode of the first middle diode 112C. In FIG. 1, a current sense resistor 119 is illustrated between the anode of the first input diode 112A and the anode of the first middle diode 112C. Although the current sense resistor 119 is not illustrated in the other Figures, it should be understood that, in some embodiments, the current sense resistor 119 can be used as a mechanism to sense voltage or current. A cathode of the first middle diode 112C is coupled to an anode of the first output diode 112B, and a cathode of the first output diode 112B is coupled to the output terminal 113B. Thus, the output and middle diodes 112B, 112C have similar orientations, and the input diode 112A has an orientation that is opposite the orientation of the output and middle diodes 112B, 112C.

Each diode 112A, 112B, 112C in the first group of line diodes 112 is associated with a corresponding switch 114A, 114B, 114C. To illustrate, a first input switch 114A is associated with the first input diode 112A, a first output switch 114B is associated with the first output diode 112B, and a first middle switch 114C is associated with the first middle diode 112C. According to one example, to improve efficiency and reduce voltage drop-off across the diodes 112B, 112C, the diodes 112B, 112C and the corresponding switches 114B, 114C can be integrated into metal-oxide-semiconductor-field-effect-transistor (MOSFET) ideal diode circuits. To illustrate, in some embodiments, the first output diode 112B and a first output switch 114B are integrated into a MOSFET ideal diode circuit 190, as illustrated in FIG. 1. Similarly, the first middle diode 112C and a first middle switch 114C are integrated into a MOSFET ideal diode circuit.

The switches 114 are controllable by respective controllers 116 based on a sensed voltage. To illustrate, a first input controller 116A is configured to sense a voltage across the first input diode 112A and selectively activate the first input switch 114A based on the voltage. For example, the first input controller 116A is configured to sense a current or voltage across the sensing resistor 119. In response to detecting a forward voltage, the first input controller 116A is configured to activate the first input switch 114A. The first input controller 116A is also configured to detect an overcurrent. In response to detecting an overcurrent (or an overvoltage), the first input controller 116A is configured to deactivate the first input switch 114A. Also, the first input controller 116A and the first input switch 114A provide inrush current (e.g., transient current) protection.

A first output controller 116B is configured to provide reverse voltage protection to the first input power bus 110. For example, the first output controller 116B can be configured to deactivate the first output switch 114B in response to the voltage across the first output diode 112B indicating a reverse voltage. In a similar manner, a first middle controller 116C is configured to provide additional reverse voltage protection to the first input power bus 110. For example, the first middle controller 116C can be configured to deactivate the first middle switch 114C in response to the voltage across the first middle diode 112C indicating a reverse voltage. Thus, the controllers 116B, 116C prevent a reverse current from flowing through the first input power bus 110 by deactivating the corresponding switches 114B, 114C in response to sensing a reverse voltage. Additionally, because of the orientation of the middle and output diodes 112C, 112B, a reverse current is prevented from flowing through the middle and output diodes 112C, 112B.

The second input power bus 120 includes a second input terminal 123A and a second output terminal 123B. The second input terminal 123A is coupled to a second input power source 128, and the second output terminal 123B is coupled to the first output terminal 113B. The second input power source 128 is configured to provide a power signal (e.g., a current signal) across the second input power bus 120 to the load 130.

The second input power bus 120 also includes a second group of line diodes 122 between the second input terminal 123A and the second output terminal 123B. The second group of line diodes includes a second input diode 122A, a second output diode 122B, and a second middle diode 122C. A cathode of the second input diode 122A is coupled to the second input terminal 123A, and an anode of the second input diode 122A is coupled to an anode of the second middle diode 122C. In FIG. 1, a current sense resistor 129 is illustrated between the anode of the second input diode 122A and the anode of the second middle diode 122C. Although the current sense resistor 129 is not illustrated in the other Figures, it should be understood that, in some embodiments, the current sense resistor 129 can be used as a mechanism to sense voltage or current. A cathode of the second middle diode 122C is coupled to an anode of the second output diode 122B, and a cathode of the second output diode 122B is coupled to the output terminal 123B. Thus, the output and middle diodes 122B, 122C have similar orientations, and the input diode 122A has an orientation that is opposite the orientation of the output and middle diodes 122B, 122C.

Each diode 122A, 122B, 122C in the second group of line diodes 122 is associated with a corresponding switch 124A, 124B, 124C. To illustrate, a second input switch 124A is associated with the second input diode 122A, a second output switch 124B is associated with the second output diode 122B, and a second middle switch 124C is associated with the second middle diode 122C. According to one example, to improve efficiency and reduce voltage drop-off across the diodes 122B, 122C, the diodes 122B, 122C and the corresponding switches 124B, 124C can be integrated into MOSFET ideal diode circuits. For example, in some embodiments, the second output diode 122B and a second output switch 124B are integrated into a MOSFET ideal diode circuit, and the second middle diode 122C and a second middle switch 124C are integrated into a MOSFET ideal diode circuit.

The switches 124 are controllable by respective controllers 126 based on a sensed voltage. To illustrate, a second input controller 126A is configured to sense a voltage across the second input diode 122A and selectively activate the second input switch 124A based on the voltage. For example, the second input controller 126A is configured to sense a current or voltage across the sensing resistor 129. In response to detecting a forward voltage, the second input controller 126A is configured to activate the second input switch 124A. The second input controller 126A is also configured to detect an overcurrent. In response to detecting an overcurrent (or an overvoltage), the second input controller 126A is configured to deactivate the second input switch 124A. Also, the second input controller 126A and the second input switch 124A provide inrush current (e.g., transient current) protection.

A second output controller 126B is configured to provide reverse voltage protection to the second input power bus 120. For example, the second output controller 126B can be configured to deactivate the second output switch 124B in response to the voltage across the second output diode 122B indicating a reverse voltage. In a similar manner, a second middle controller 126C is configured to provide additional reverse voltage protection to the second input power bus 120. For example, the second middle controller 126C can be configured to deactivate the second middle switch 124C in response to the voltage across the second middle diode 122C indicating a reverse voltage. Thus, the controllers 126B, 126C prevent a reverse current from flowing through the second input power bus 120 by deactivating the corresponding switches 124B, 124C in response to sensing a reverse voltage. Additionally, because of the orientation of the middle and output diodes 122C, 122B, a reverse current is prevented from flowing through the middle and output diodes 122C, 122B.

The dual-input bus 100 of FIG. 1 provides a redundant dual-input power bus architecture that ensures adequate power is supplied to the load 130 under a plurality of different operating scenarios. For example, the architecture of the dual-input bus 100 provides for physical and electrical isolation between power inputs to ensure that an adequate power signal (e.g., a current signal) is provided to the load 130 if different line diodes 112, 122 fail (e.g., short). In particular, as described in greater detail with respect to FIGS. 2-12, the diodes 112B, 112C, 122B, 122C provide reverse polarity protection at the front end of the load 130 in scenarios where different line diodes 112, 122 fail, and the diodes 112A, 122A provide inrush current protection, under voltage protection, and over voltage protection.

Figure 2:
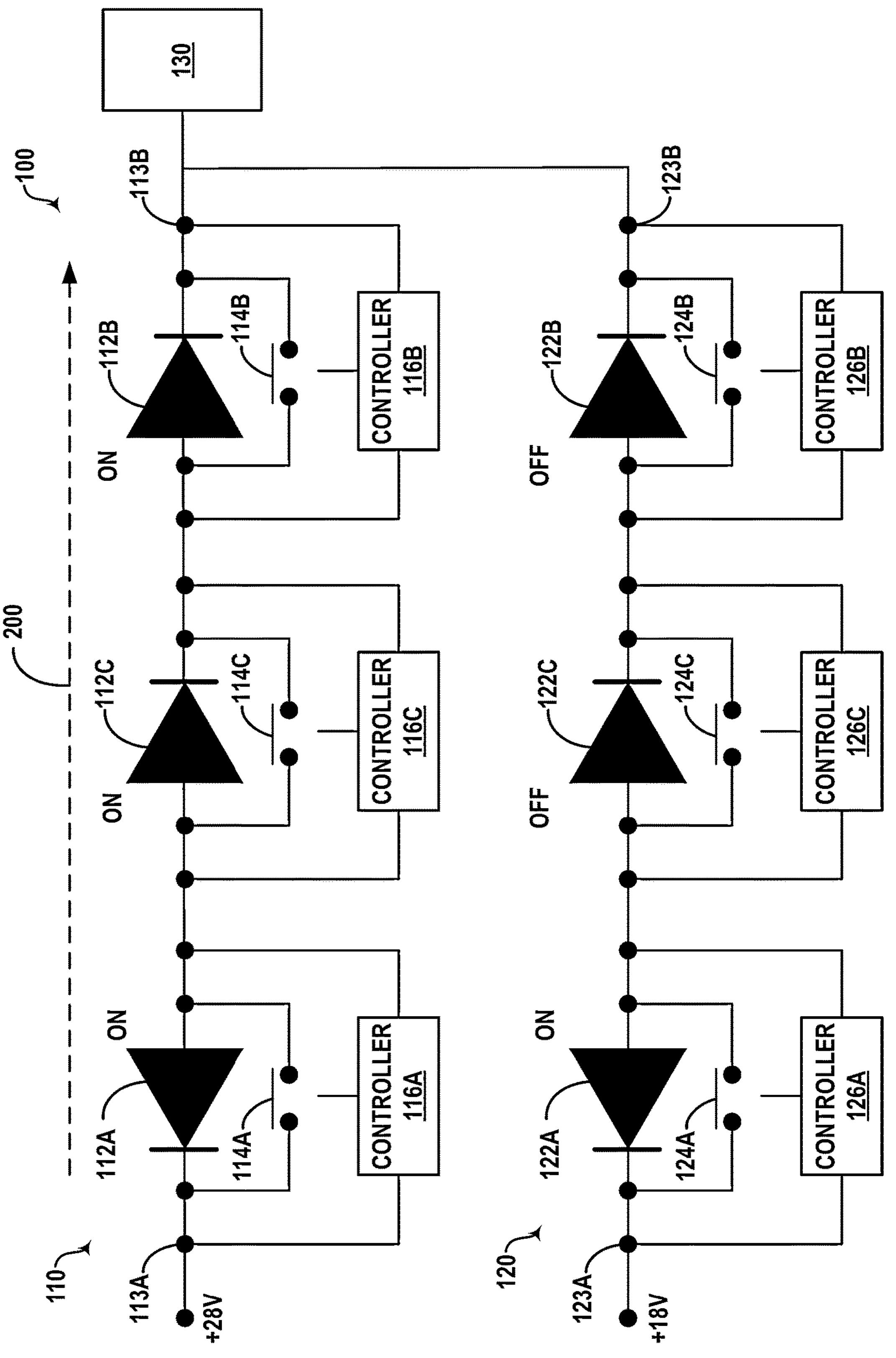
FIG. 2 illustrates an operating scenario of the dual-input bus, according to an exemplary embodiment.

Referring to FIG. 2, an operating scenario of the dual-input bus 100 is illustrated, in accordance with an exemplary embodiment. With respect to FIG. 2, each diode 112A-112C in the first group of line diodes 112 and each diode 122A-122C in the second group of line diodes 122 is functioning properly.

In the operating scenario described with respect to FIG. 2, both input power busses 110, 120 are provided with an input voltage; however, the input voltage applied to the first input power bus 110 is greater than the input voltage applied to the second input power bus 120. For example, as illustrated in FIG. 2, the first input power source 118 provides an input voltage of twenty-eight (28) volts to the first input power bus 110, and the second input power source 128 provides an input voltage of eighteen (18) volts to the second input power bus 120.

In FIG. 2, the controller 116A senses the forward voltage and activates the switch 114A to enable a current 200 to flow through the first input power bus 110, as illustrated. The controller 116A can also be configured to deactivate the switch 114A in response to detecting an overcurrent on the first input bus 110. Thus, the controller 116A and the switch 114A can limit inrush of the current 200 (e.g., a current transient) upon power up. The controllers 116B, 116C sense the forward voltage and close the respective switches 114B, 114C. Thus, the current 200 bypasses the body diodes 112B, 112C while flowing through the first input power bus 110.

The controller 126A senses more voltage than the under voltage limit and closes the switch 124A. However, the controllers 126B, 126C sense the reverse voltage and deactivate (e.g., open) the switches 124B, 124C, respectively, to provide reverse current protection to the second input power bus 120. The orientation of the diodes 122B, 122C also prevent a reverse current 200 from the first input power bus 110 from flowing into the second input power bus 120. Thus, in FIG. 2, the current 200 is provided to the load 130 via the first input power bus 110.

Figure 3:
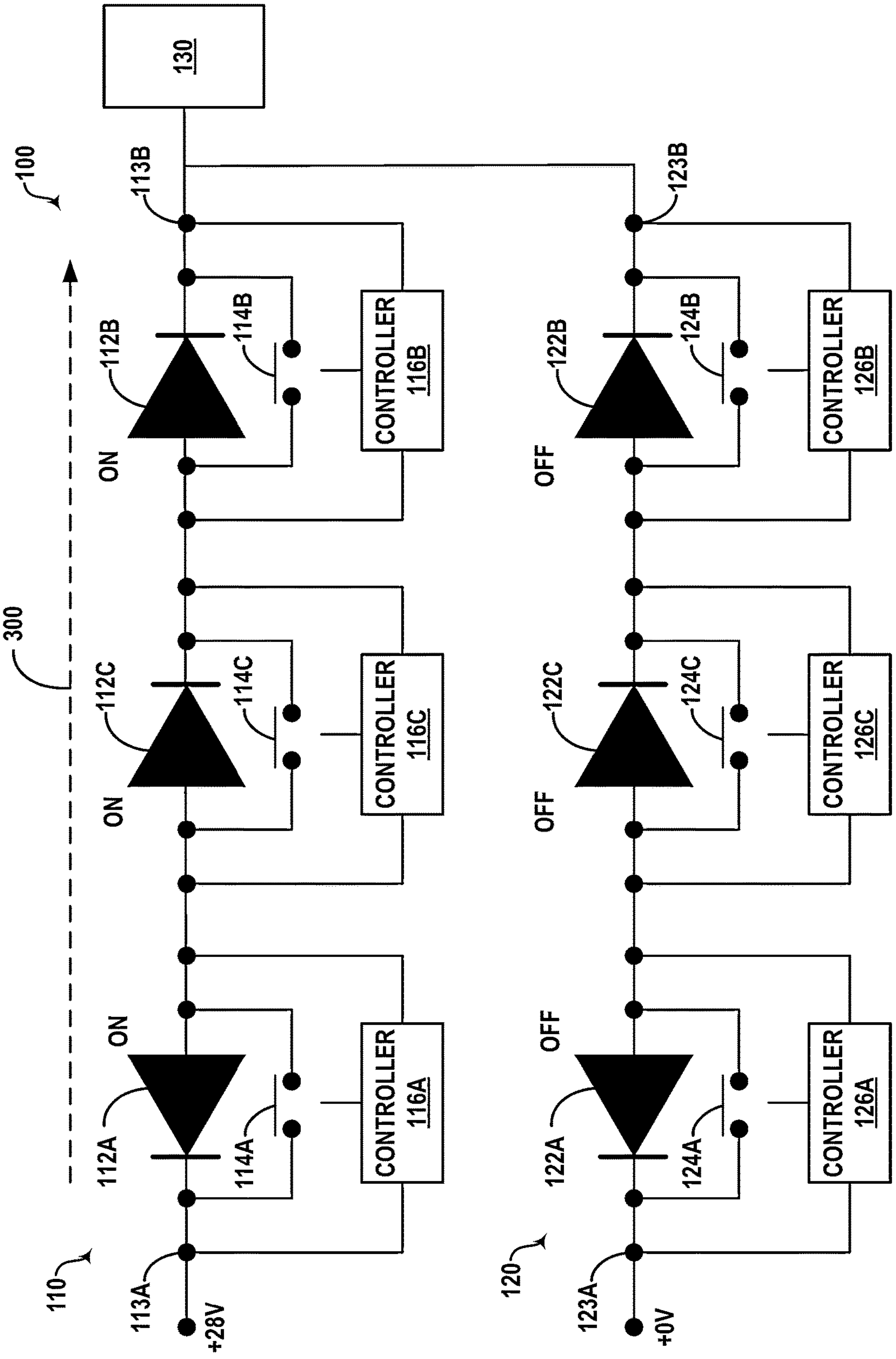
FIG. 3 illustrates another operating scenario of the dual-input bus, according to an exemplary embodiment.

Referring to FIG. 3, another operating scenario of the dual-input bus 100 is illustrated, in accordance with an exemplary embodiment. With respect to FIG. 3, each diode

112A-112C in the first group of line diodes 112 and each diode 122A-122C in the second group of line diodes 122 is functioning properly.

In the operating scenario described with respect to FIG. 3, the first input power bus 110 is provided with an input voltage, and no voltage is applied to the second input power bus 120. For example, as illustrated in FIG. 3, the first input power source 118 provides an input voltage of twenty-eight (28) volts to the first input power bus 110, and the second input power source 128 does not provide a voltage to the second input power bus 120.

In FIG. 3, the controller 116A senses the forward voltage and activates the switch 114A to enable a current 300 to flow through the first input power bus 110, as illustrated. The controller 116A can also be configured to deactivate the switch 114A in response to detecting an overcurrent on the first input bus 110. Thus, the controller 116A and the switch 114A can limit inrush of the current 300 (e.g., a current transient) upon power up. The controllers 116B, 116C sense the forward voltage and close the respective switches 114B, 114C. Thus, the current 300 bypasses the body diodes 112B, 112C while flowing through the first input power bus 110.

The controller 126A senses the zero voltage and deactivates (e.g., opens) the switch 124A. The controllers 126B, 126C sense the reverse voltage and deactivate (e.g., open) the switches 124B, 124C, respectively, to provide reverse current protection to the second input power bus 120. The orientation of the diodes 122B, 122C also prevent a reverse current 300 from the first input power bus 110 from flowing into the second input power bus 120. Thus, in FIG. 3, the current 300 is provided to the load 130 via the first input power bus 110.

Figure 4:
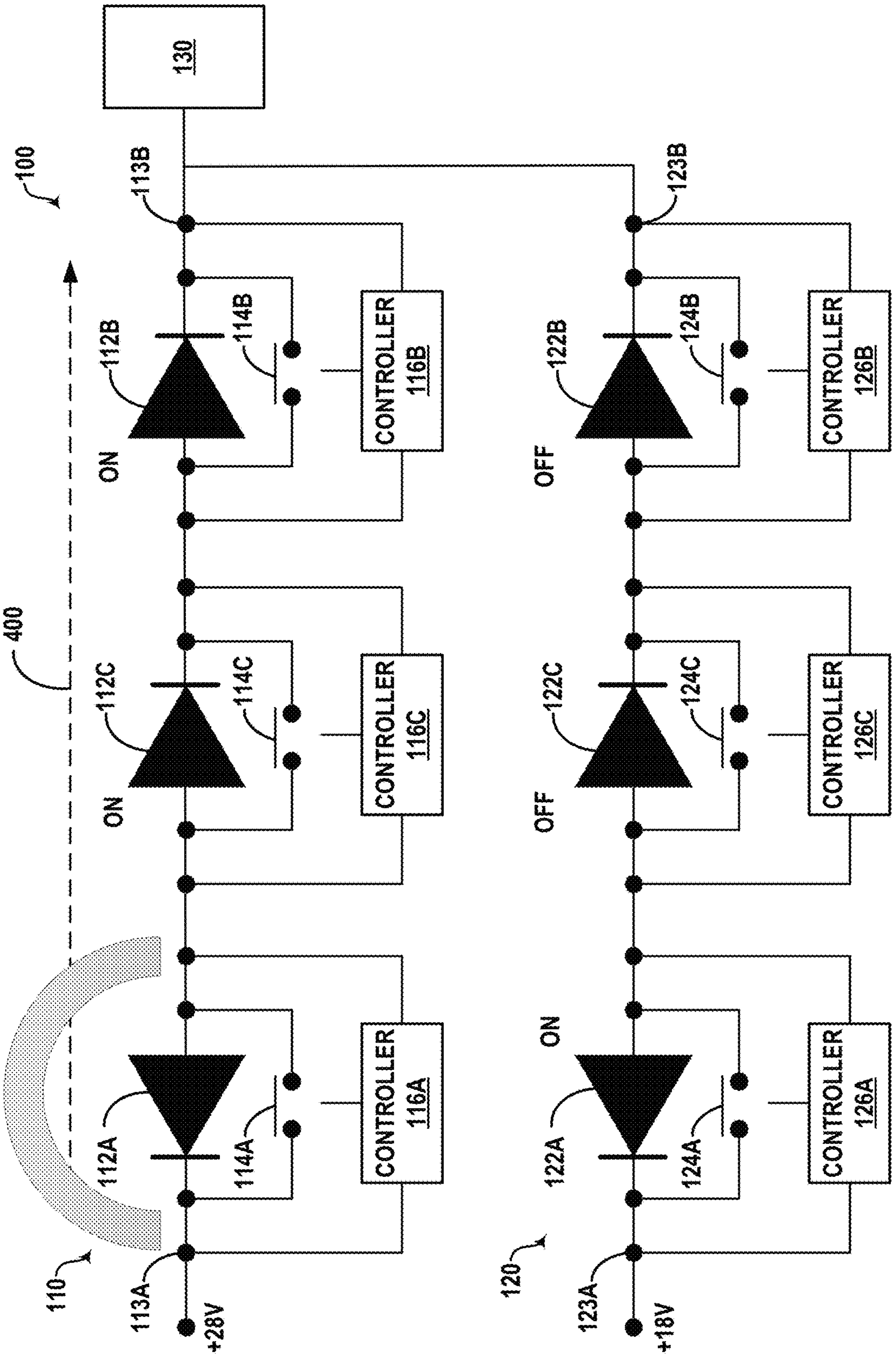
FIG. 4 illustrates another operating scenario of the dual-input bus, according to an exemplary embodiment.

Referring to FIG. 4, another operating scenario of the dual-input bus 100 is illustrated, in accordance with an exemplary embodiment. With respect to FIG. 4, the diode 112A has experienced a short failure. The other diodes 112B, 112C in the first group of line diodes 112 are functioning properly, and each diode 122A-122C in the second group of line diodes 122 is functioning properly. As described with respect to FIG. 4, the architecture of the dual-input bus 100 enables adequate power to be provided to the load 130 in spite of the short failure of the diode 112A.

In the operating scenario described with respect to FIG. 4, both input power busses 110, 120 are provided with an input voltage; however, the input voltage applied to the first input power bus 110 is greater than the input voltage applied to the second input power bus 120. For example, as illustrated in FIG. 4, the first input power source 118 provides an input voltage of twenty-eight (28) volts to the first input power bus 110, and the second input power source 128 provides an input voltage of eighteen (18) volts to the second input power bus 120.

In FIG. 4, because the diode 112A experienced a short failure, the controller 116A and the switch 114A do not limit inrush of a current 400 on the first input power bus 110. The controllers 116B, 116C sense the forward voltage and close the respective switches 114B, 114C. Thus, the current 400 bypasses the body diodes 112B, 112C while flowing through the first input power bus 110.

The controller 126A senses more voltage than the under voltage limit and closes the switch 124A. However, the controllers 126B, 126C sense the reverse voltage and deactivate (e.g., open) the switches 124B, 124C, respectively, to provide reverse current protection to the second input power bus 120. The orientation of the diodes 122B, 122C also prevent a reverse current 400 from the first input power bus 110 from flowing into the second input power bus 120.

Thus, in FIG. 4, the current 400 is provided to the load 130 via the first input power bus 110. The second input power bus 120 is unaffected by the short failure of the diode 112A, and the load 130 (e.g., the converter) operates without inrush protection.

Figure 5:
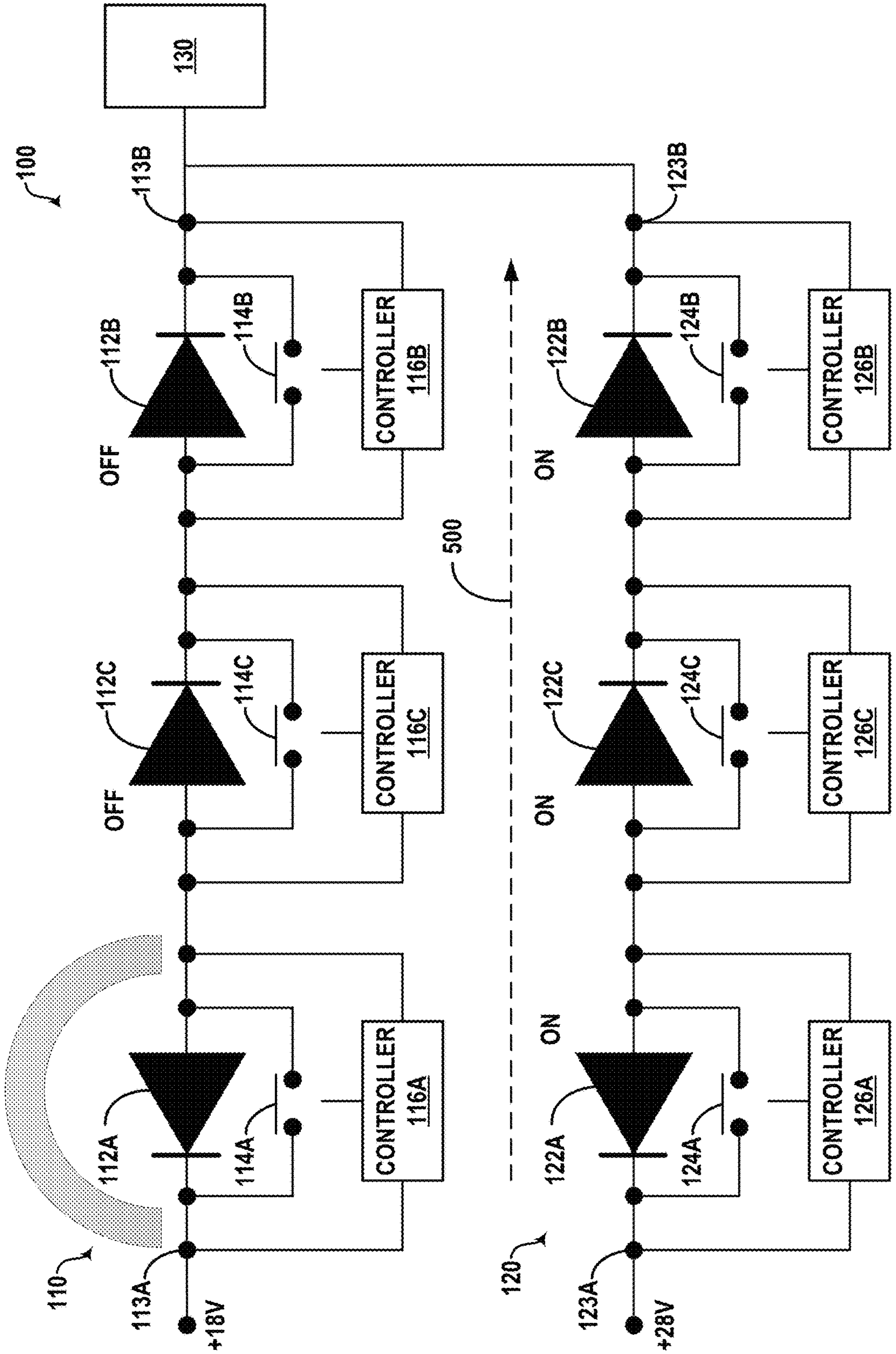
FIG. 5 illustrates another operating scenario of the dual-input bus, according to an exemplary embodiment.

Referring to FIG. 5, another operating scenario of the dual-input bus 100 is illustrated, in accordance with an exemplary embodiment. With respect to FIG. 5, the diode 112A has experienced a short failure. The other diodes 112B, 112C in the first group of line diodes 112 are functioning properly, and each diode 122A-122C in the second group of line diodes 122 is functioning properly. As described with respect to FIG. 5, the architecture of the dual-input bus 100 enables adequate power to be provided to the load 130 in spite of the short failure of the diode 112A.

In the operating scenario described with respect to FIG. 5, both input power busses 110, 120 are provided with an input voltage; however, the input voltage applied to the first input power bus 110 is less than the input voltage applied to the second input power bus 120. For example, as illustrated in FIG. 5, the first input power source 118 provides an input voltage of eighteen (18) volts to the first input power bus 110, and the second input power source 128 provides an input voltage of twenty-eight (28) volts to the second input power bus 120.

In FIG. 5, the controller 126A senses the forward voltage and activates the switch 124A to enable a current 500 to flow through the second input power bus 120, as illustrated. The controller 126A can also be configured to deactivate the switch 124A in response to detecting an overcurrent on the second input power bus 120. Thus, the controller 126A and the switch 124A can limit inrush of the current 500 (e.g., a current transient) upon power up. The controllers 126B, 126C sense the forward voltage and close the respective switches 124B, 124C. Thus, the current 500 bypasses the body diodes 122B, 122C while flowing through the second input power bus 120.

The controllers 116B, 116C sense the reverse voltage and deactivate (e.g., open) the switches 114B, 114C, respectively, to provide reverse current protection to the first input power bus 110. The orientation of the diodes 112B, 112C also prevent a reverse current 500 from the second input power bus 120 from flowing into the first input power bus 110. Thus, in FIG. 5, the current 500 is provided to the load 130 via the second input power bus 120.

Figure 6:
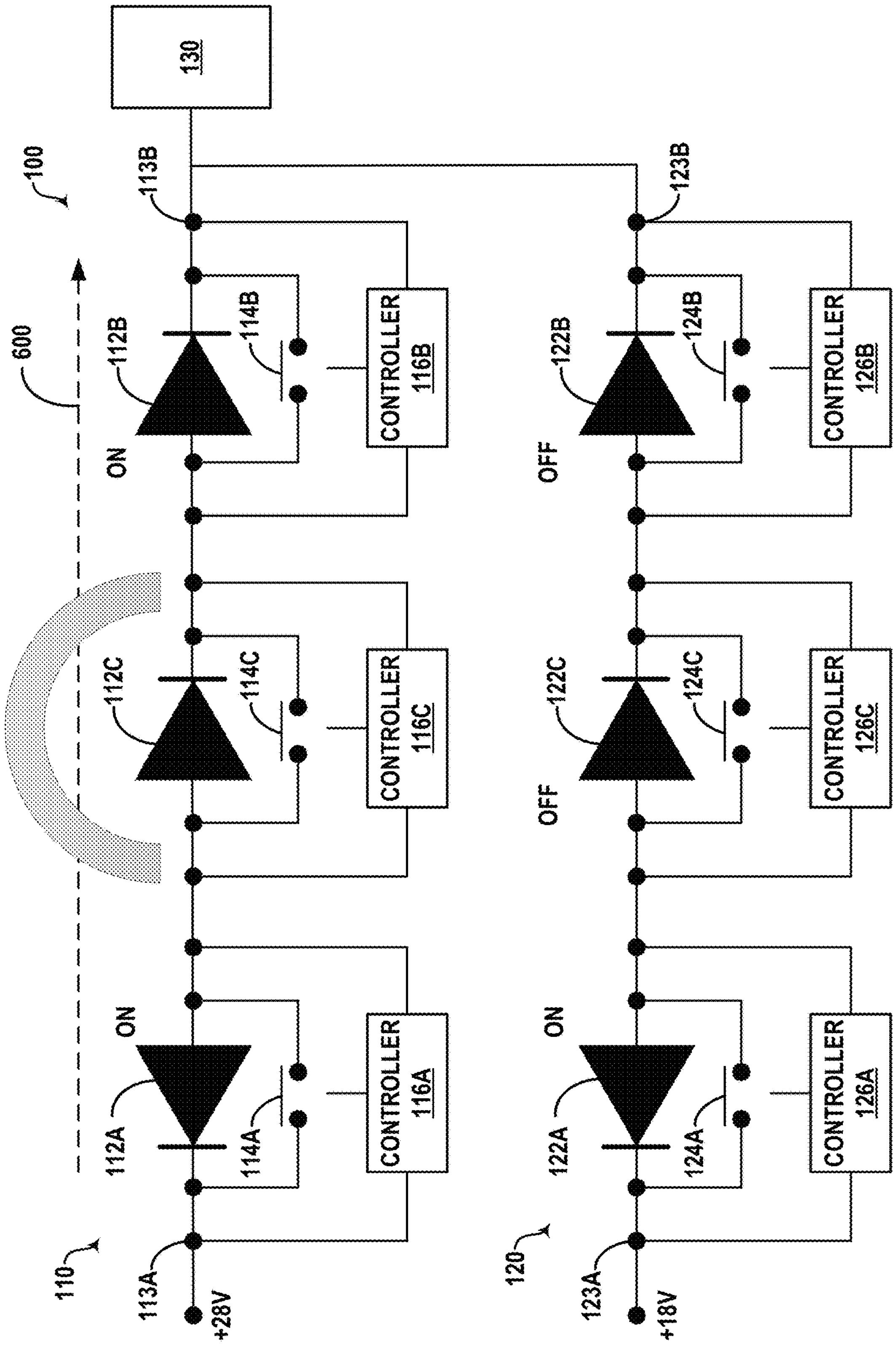
FIG. 6 illustrates another operating scenario of the dual-input bus, according to an exemplary embodiment.

Referring to FIG. 6, another operating scenario of the dual-input bus 100 is illustrated, in accordance with an exemplary embodiment. With respect to FIG. 6, the diode 112C has experienced a short failure. The other diodes 112A, 112C in the first group of line diodes 112 are functioning properly, and each diode 122A-122C in the second group of line diodes 122 is functioning properly. As described with respect to FIG. 6, the architecture of the dual-input bus 100 enables adequate power to be provided to the load 130 in spite of the short failure of the diode 112C.

In the operating scenario described with respect to FIG. 6, both input power busses 110, 120 are provided with an input voltage; however, the input voltage applied to the first input power bus 110 is greater than the input voltage applied to the second input power bus 120. For example, as illustrated in FIG. 6, the first input power source 118 provides an input voltage of twenty-eight (28) volts to the first input power bus 110, and the second input power source 128 provides an input voltage of eighteen (18) volts to the second input power bus 120.

In FIG. 6, the controller 116A senses the forward voltage and activates the switch 114A to enable a current 600 to flow through the first input power bus 110, as illustrated. The controller 116A can also be configured to deactivate the switch 114A in response to detecting an overcurrent on the first input bus 110. Thus, the controller 116A and the switch 114A can limit inrush of the current 600 (e.g., a current transient) upon power up. The controller 116B senses the forward voltage and closes the switch 114B. Thus, the current 600 bypasses the body diode 112B while flowing through the first input power bus 110.

The controller 126A senses more voltage than the under voltage limit and closes the switch 124A. However, the controllers 126B, 126C sense the reverse voltage and open the switches 124B, 124C, respectively. The diodes 122B, 122C prevent a reverse current 600 from the first input power bus 110 from flowing into the second input power bus 120. Thus, in FIG. 6, the current 600 is provided to the load 130 via the first input power bus 110.

The controller 126A senses more voltage than the under voltage limit and closes the switch 124A. However, the controllers 126B, 126C sense the reverse voltage and deactivate (e.g., open) the switches 124B, 124C, respectively, to provide reverse current protection to the second input power bus 120. The orientation of the diodes 122B, 122C also prevent a reverse current 600 from the first input power bus 110 from flowing into the second input power bus 120. Thus, in FIG. 6, the current 600 is provided to the load 130 via the first input power bus 110.

Figure 7:
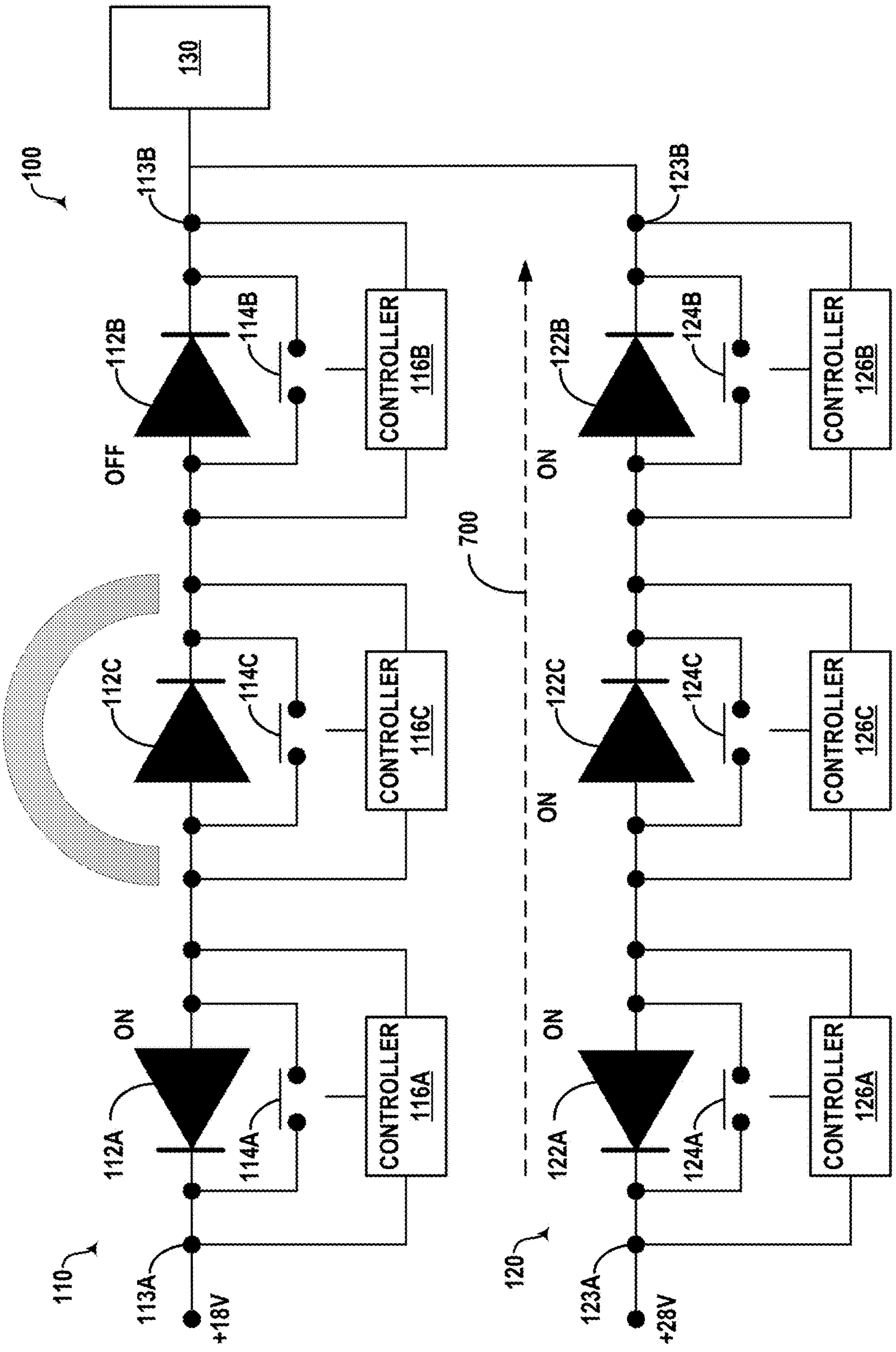
FIG. 7 illustrates another operating scenario of the dual-input bus, according to an exemplary embodiment.

Referring to FIG. 7, another operating scenario of the dual-input bus 100 is illustrated, in accordance with an exemplary embodiment. With respect to FIG. 7, the diode 112C has experienced a short failure. The other diodes 112A, 112C in the first group of line diodes 112 are functioning properly and each diode 122A-122C in the second group of line diodes 122 is functioning properly. As described with respect to FIG. 7, the architecture of the dual-input bus 100 enables adequate power to be provided to the load 130 in spite of the short failure of the diode 112C.

In the operating scenario described with respect to FIG. 7, both input power busses 110, 120 are provided with an input voltage; however, the input voltage applied to the first input power bus 110 is less than the input voltage applied to the second input power bus 120. For example, as illustrated in FIG. 7, the first input power source 118 provides an input voltage of eighteen (18) volts to the first input power bus 110, and the second input power source 128 provides an input voltage of twenty-eight (28) volts to the second input power bus 120.

In FIG. 7, the controller 126A senses the forward voltage and activates the switch 124A to enable a current 700 to flow through the second input power bus 120, as illustrated. The controller 126A can also be configured to deactivate the switch 124A in response to detecting an overcurrent on the second input power bus 120. Thus, the controller 126A and the switch 124A can limit inrush of the current 700 (e.g., a current transient) upon power up. The controllers 126B, 126C sense the forward voltage and close the respective switches 124B, 124C. Thus, the current 700 bypasses the body diodes 122B, 122C while flowing through the second input power bus 120.

The controller 126A senses more voltage than the under voltage limit and closes the switch 124A. However, the controllers 126B sensed the reverse voltage and deactivates (e.g., open) the switch 124B to provide reverse current protection to the first input power bus 110. The orientation of the diode 122B also prevents a reverse current 700 from the second input power bus 120 from flowing into the first input power bus 110. Thus, in FIG. 7, the current 700 is provided to the load 130 via the second input power bus 120.

Figure 8:
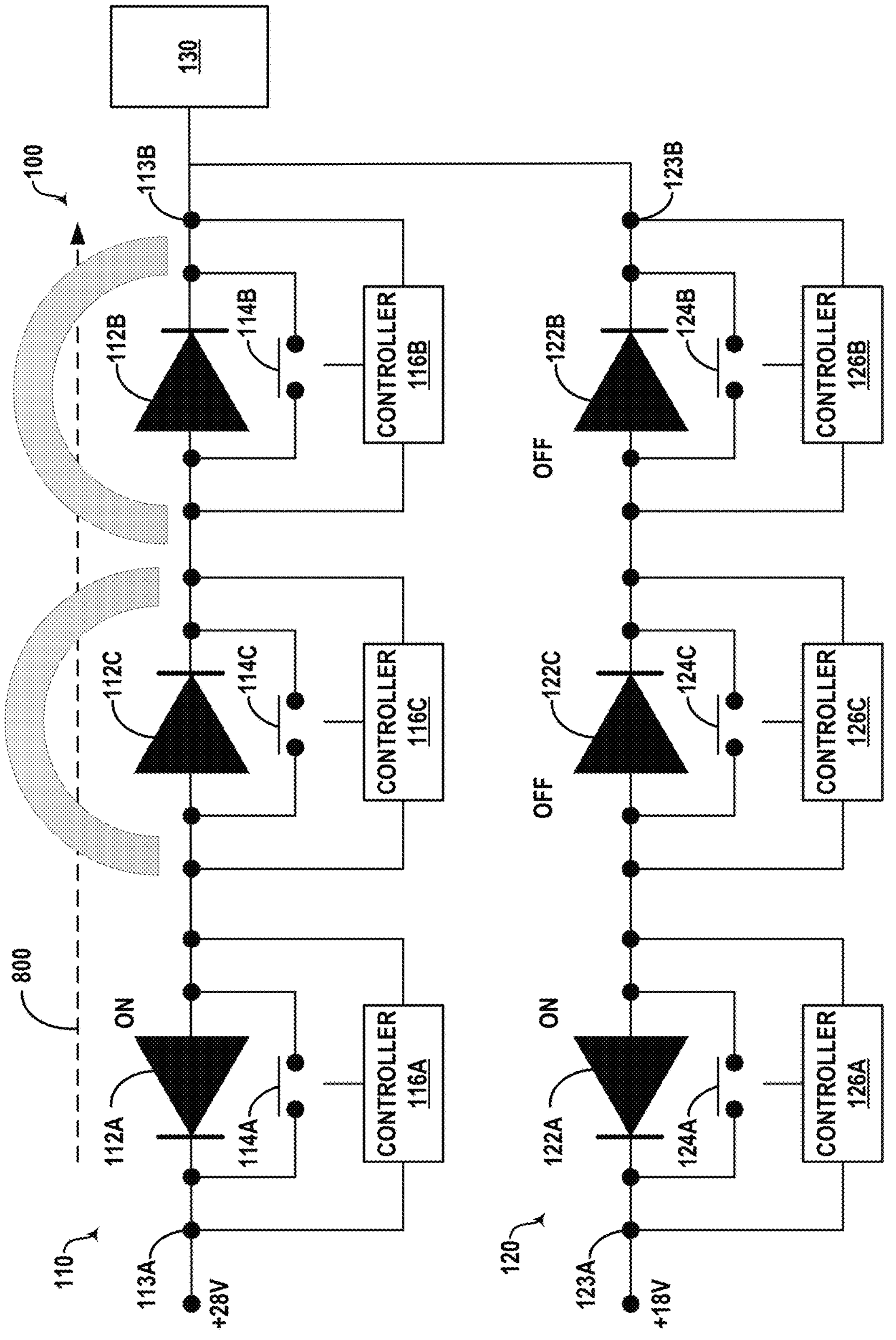
FIG. 8 illustrates another operating scenario of the dual-input bus, according to an exemplary embodiment.

Referring to FIG. 8, another operating scenario of the dual-input bus 100 is illustrated, in accordance with an exemplary embodiment. With respect to FIG. 8, the diodes 112B, 112C have experienced a short failure. The other diode 112A in the first group of line diodes 112 is functioning properly, and each diode 122A-122C in the second group of line diodes 122 is functioning properly. As described with respect to FIG. 8, the architecture of the dual-input bus 100 enables adequate power to be provided to the load 130 in spite of the short failure of the diodes 112B, 112C.

In the operating scenario described with respect to FIG. 8, both input power busses 110, 120 are provided with an input voltage; however, the input voltage applied to the first input power bus 110 is greater than the input voltage applied to the second input power bus 120. For example, as illustrated in FIG. 8, the first input power source 118 provides an input voltage of twenty-eight (28) volts to the first input power bus 110, and the second input power source 128 provides an input voltage of eighteen (18) volts to the second input power bus 120.

In FIG. 8, the controller 116A senses the forward voltage and activates the switch 114A to enable a current 800 to flow through the first input power bus 110, as illustrated. The controller 116A can also be configured to deactivate the switch 114A in response to detecting an overcurrent on the first input bus 110. Thus, the controller 116A and the switch 114A can limit inrush of the current 300 (e.g., a current transient) upon power up.

The controller 126A senses more voltage than the under voltage limit and closes the switch 124A. However, the controllers 126B, 126C sense the reverse voltage and deactivate (e.g., open) the switches 124B, 124C, respectively, to provide reverse current protection to the second input power bus 120. The orientation of the diodes 122B, 122C also prevent a reverse current 800 from the first input power bus 110 from flowing into the second input power bus 120. Thus, in FIG. 8, the current 800 is provided to the load 130 via the first input power bus 110.

Figure 9:
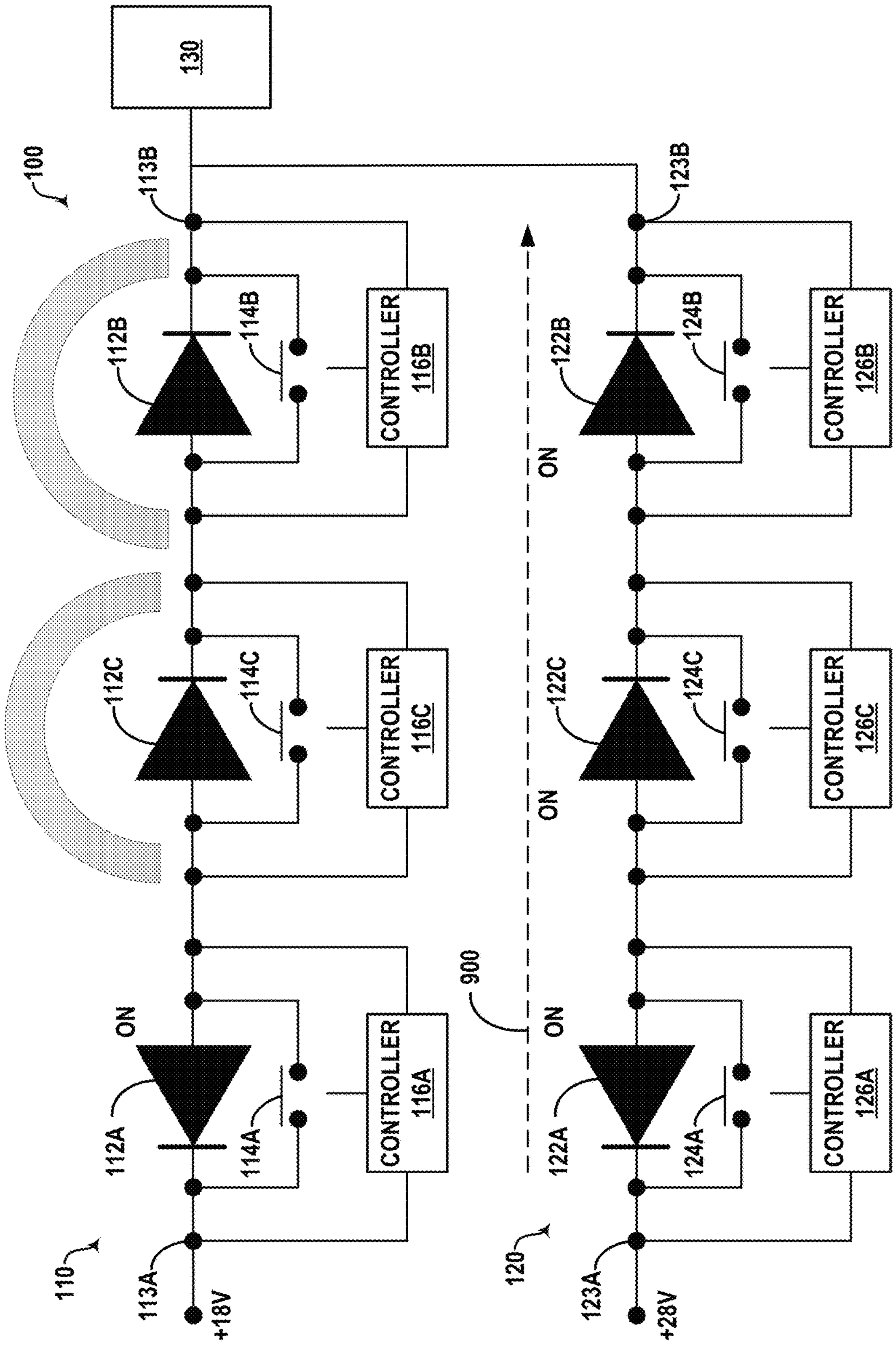
FIG. 9 illustrates another operating scenario of the dual-input bus, according to an exemplary embodiment.

Referring to FIG. 9, another operating scenario of the dual-input bus 100 is illustrated, in accordance with an exemplary embodiment. With respect to FIG. 9, the diodes 112B, 112C have experienced a short failure. The other diode 112A in the first group of line diodes 112 is functioning properly, and each diode 122A-122C in the second group of line diodes 122 is functioning properly. As described with respect to FIG. 9, the architecture of the dual-input bus 100 enables adequate power to be provided to the load 130 in spite of the short failure of the diodes 112B, 112C.

In the operating scenario described with respect to FIG. 9, both input power busses 110, 120 are provided with an input voltage; however, the input voltage applied to the first input power bus 110 is less than the input voltage applied to the second input power bus 120. For example, as illustrated in FIG. 9, the first input power source 118 provides an input voltage of eighteen (18) volts to the first input power bus 110, and the second input power source 128 provides an input voltage of twenty-eight (28) volts to the second input power bus 120.

In FIG. 9, the controller 126A senses the forward voltage and activates the switch 124A to enable a current 900 to flow through the second input power bus 120, as illustrated. The controller 126A can also be configured to deactivate the switch 124A in response to detecting an overcurrent on the second input power bus 120. Thus, the controller 126A and the switch 124A can limit inrush of the current 900 (e.g., a current transient) upon power up. The controllers 126B, 126C sense the forward voltage and close the respective switches 124B, 124C. Thus, the current 900 bypasses the body diodes 122B, 122C while flowing through the second input power bus 120.

Because the diodes 112B, 112C experienced a short failure, the diodes 112B, 112C do not provide reverse current protection. As a result, in FIG. 9, the second input power bus 120 feeds current 900 to the first input power bus 110 due to the reverse current protection failure of the diodes 112B, 112C. The switch 124A will turn off because of the overcurrent protection (e.g., forward current sensing), and as the switch 124A turns off, the first input power bus 110 starts to provide power to the load 130. Thus, the load will continue to receive the power if overcurrent protection occurs. And in FIG. 9, current is continuously fed from the second input power bus 120 to the first input power bus 110 if the current is less than a current limit.

Figure 10:
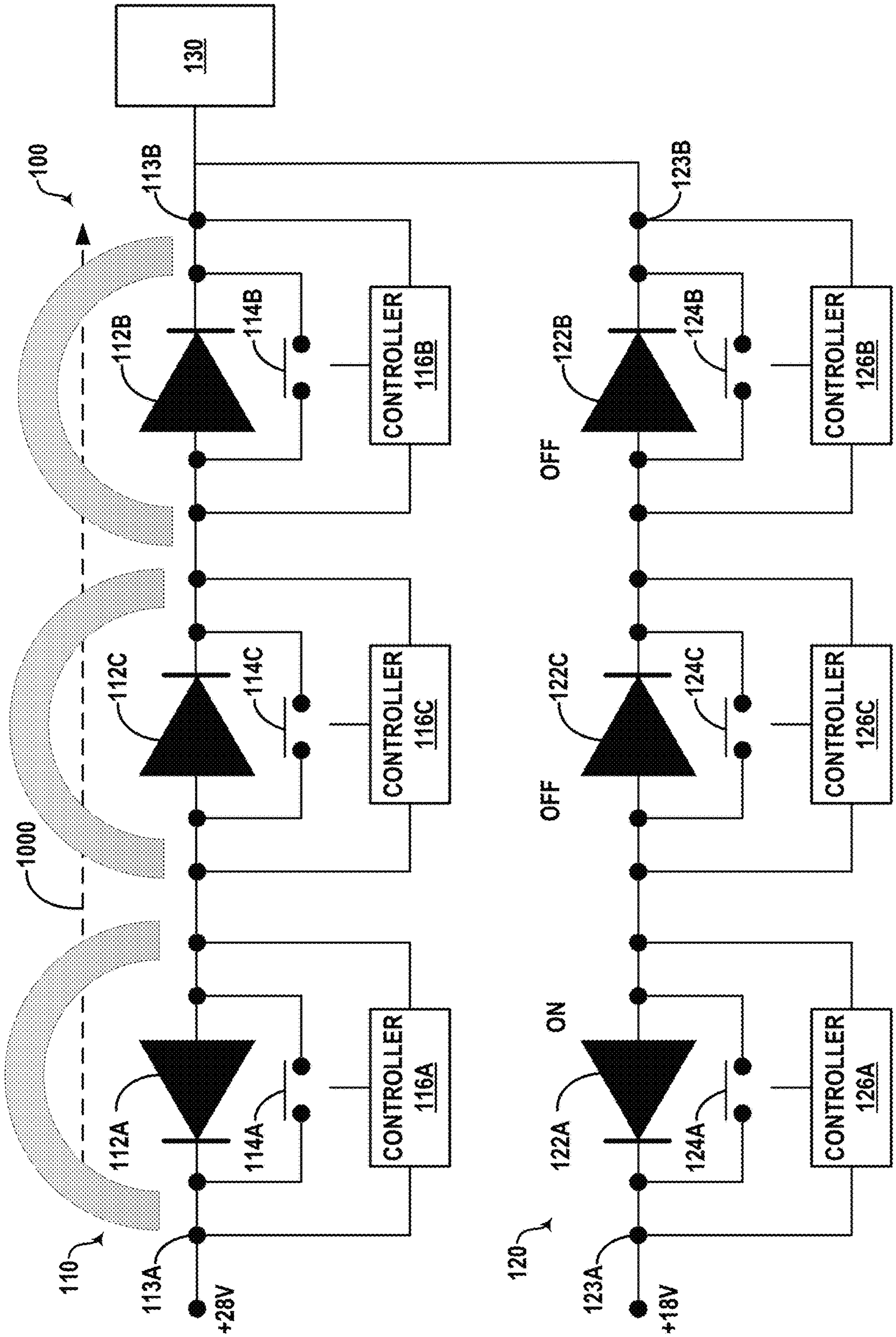
FIG. 10 illustrates another operating scenario of the dual-input bus, according to an exemplary embodiment.

Referring to FIG. 10, another operating scenario of the dual-input bus 100 is illustrated, in accordance with an exemplary embodiment. With respect to FIG. 10, the diodes 112A, 112B, 112C have experienced a short failure. Each diode 122A-122C in the second group of line diodes 122 is functioning properly. As described with respect to FIG. 10, the architecture of the dual-input bus 100 enables adequate power to be provided to the load 130 in spite of the short failure of the diodes 112B, 112C.

In the operating scenario described with respect to FIG. 10, both input power busses 110, 120 are provided with an input voltage; however, the input voltage applied to the first input power bus 110 is greater than the input voltage applied to the second input power bus 120. For example, as illustrated in FIG. 10, the first input power source 118 provides an input voltage of twenty-eight (28) volts to the first input power bus 110, and the second input power source 128 provides an input voltage of eighteen (18) volts to the second input power bus 120.

In FIG. 10, a current 1000 passes through the first input power bus 110. The controller 116A and the switch 114A do no provide inrush protection due to the failure of the diode 112A. The controllers 126B, 126C sense the reverse voltage and deactivate (e.g., open) the switches 124B, 124C, respectively, to provide reverse current protection to the second input power bus 120. The orientation of the diodes 122B, 122C also prevent a reverse current 300 from the first input power bus 110 from flowing into the second input power bus 120. Thus, in FIG. 10, the current 1000 is provided to the load 130 via the first input power bus 110.

Figure 11:
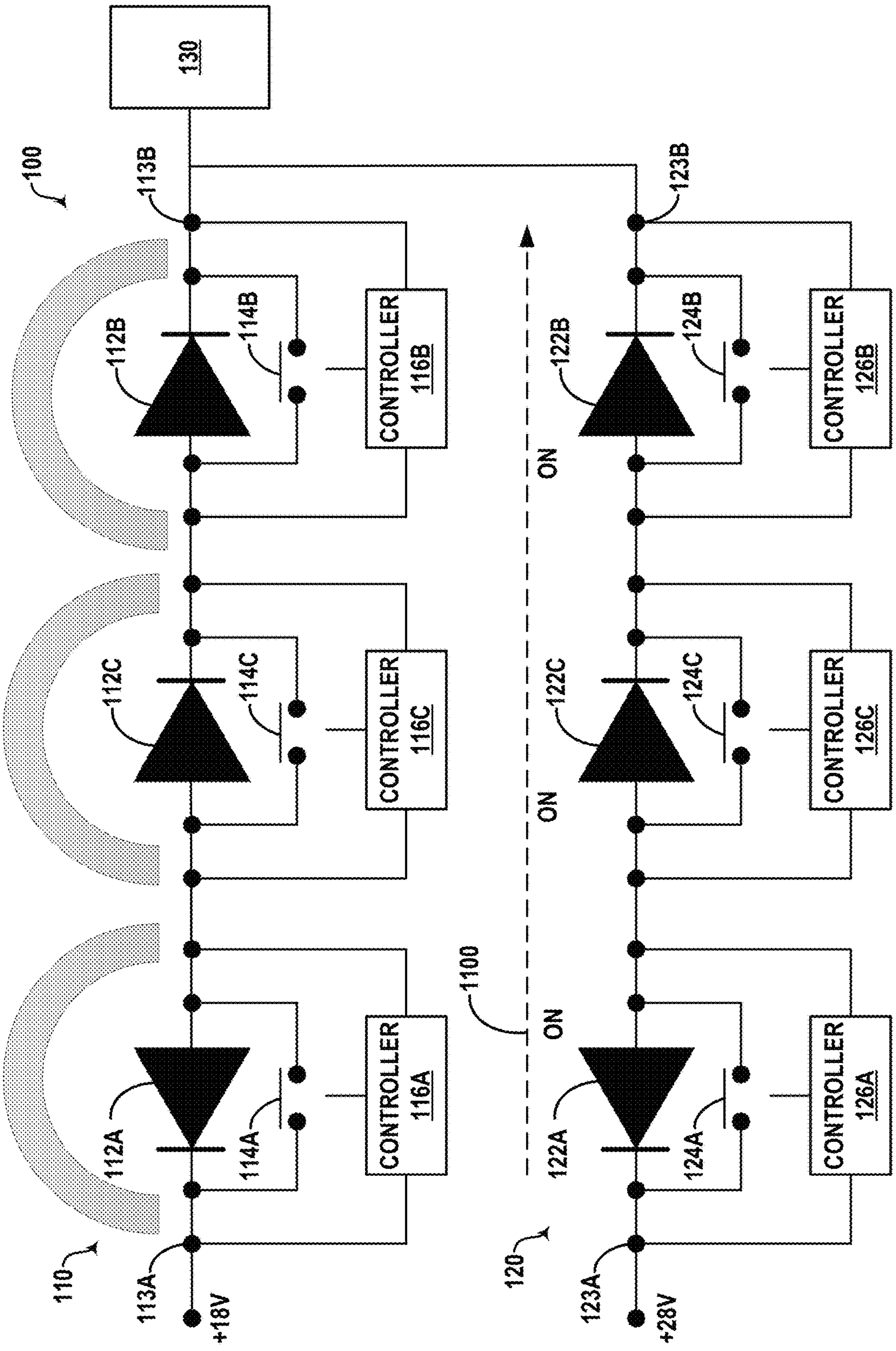
FIG. 11 illustrates another operating scenario of the dual-input bus, according to an exemplary embodiment.

Referring to FIG. 11, another operating scenario of the dual-input bus 100 is illustrated, in accordance with an exemplary embodiment. With respect to FIG. 11, the diodes 112A, 112B, 112C have experienced a short failure. Each diode 122A-122C in the second group of line diodes 122 is functioning properly. As described with respect to FIG. 11, the architecture of the dual-input bus 100 enables adequate power to be provided to the load 130 in spite of the short failure of the diodes 112A, 112B, 112C.

In the operating scenario described with respect to FIG. 11, both input power busses 110, 120 are provided with an input voltage; however, the input voltage applied to the first input power bus 110 is less than the input voltage applied to the second input power bus 120. For example, as illustrated in FIG. 11, the first input power source 118 provides an input voltage of eighteen (18) volts to the first input power bus 110, and the second input power source 128 provides an input voltage of twenty-eight (28) volts to the second input power bus 120.

In FIG. 11, the controller 126A senses the forward voltage and activates the switch 124A to enable a current 1100 to flow through the second input power bus 120, as illustrated. The controller 126A can also be configured to deactivate the switch 124A in response to detecting an overcurrent on the second input power bus 120. Thus, the controller 126A and the switch 124A can limit inrush of the current 1100 (e.g., a current transient) upon power up. The controllers 126B, 126C sense the forward voltage and close the respective switches 124B, 124C. Thus, the current 1100 bypasses the body diodes 122B, 122C while flowing through the second input power bus 120.

Because the diodes 112B, 112C experienced a short failure, the diodes 112B, 112C do not provide reverse current protection. As a result, in FIG. 11, the second input power bus 120 feeds current 1100 to the first input power bus 110 due to the reverse current protection failure of the diodes 112B, 112C. The switch 124A will turn off because of the overcurrent protection (e.g., forward current sensing), and as the switch 124A turns off, the first input power bus 110 starts to provide power to the load 130. Thus, the load will continue to receive the power if overcurrent protection occurs. And in FIG. 11, current is continuously fed from the second input power bus 120 to the first input power bus 110 if the current is less than a current limit.

Figure 12:
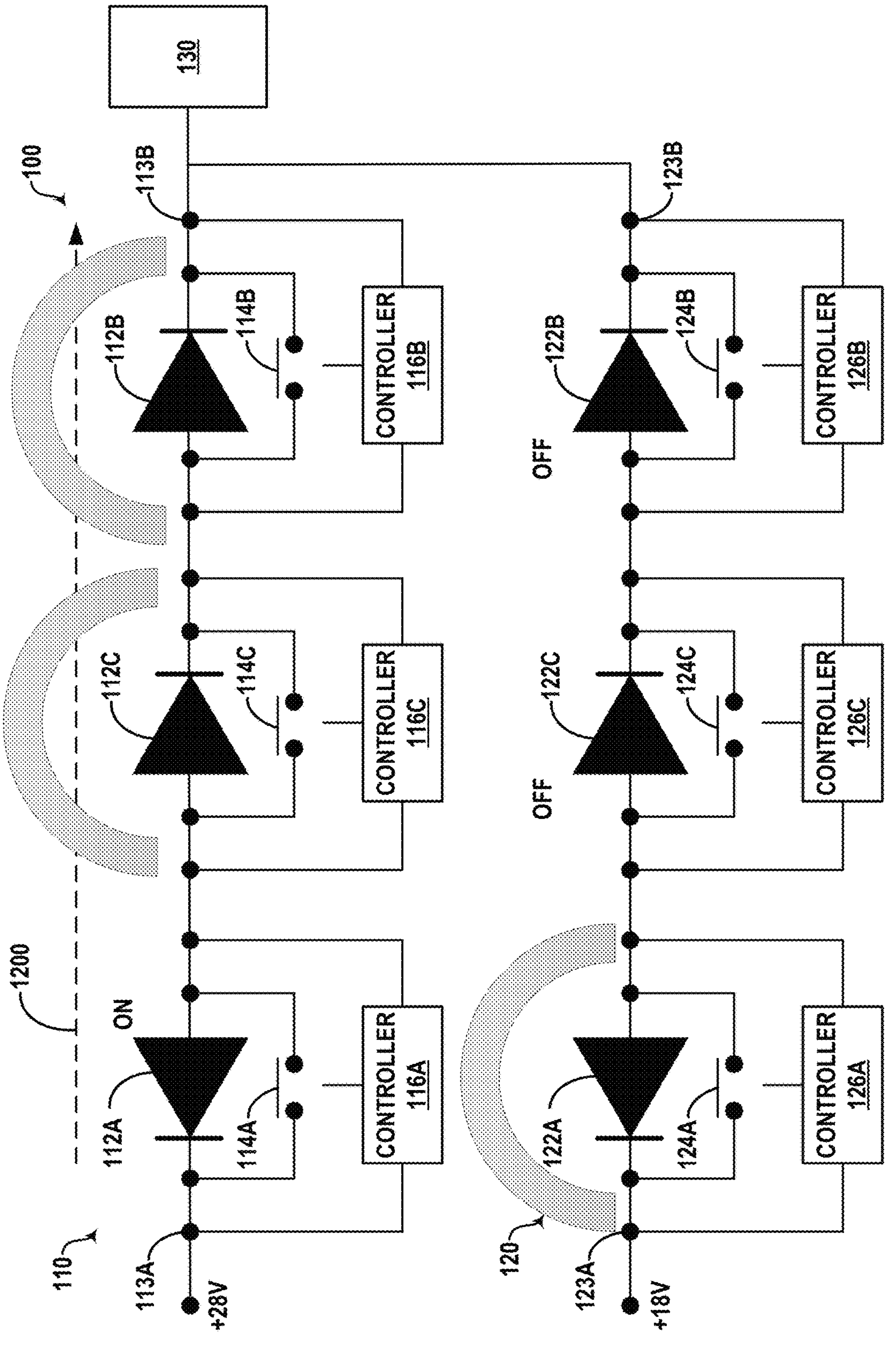
FIG. 12 illustrates another operating scenario of the dual-input bus, according to an exemplary embodiment.

Referring to FIG. 12, another operating scenario of the dual-input bus 100 is illustrated, in accordance with an exemplary embodiment. With respect to FIG. 12, the diodes 112B, 112C, 122A have experienced a short failure. The other diodes 112A, 122B, 122C are functioning properly. As described with respect to FIG. 12, the architecture of the dual-input bus 100 enables adequate power to be provided to the load 130 in spite of the short failure of the diodes 112B, 112C, 122A.

In the operating scenario described with respect to FIG. 12, both input power busses 110, 120 are provided with an input voltage; however, the input voltage applied to the first input power bus 110 is greater than the input voltage applied to the second input power bus 120. For example, as illustrated in FIG. 12, the first input power source 118 provides an input voltage of twenty-eight (28) volts to the first input power bus 110, and the second input power source 128 provides an input voltage of eighteen (18) volts to the second input power bus 120.

In FIG. 12, the controller 116A senses the forward voltage and activates the switch 114A to enable a current 1200 to flow through the first input power bus 110, as illustrated. The controller 116A can also be configured to deactivate the switch 114A in response to detecting an overcurrent on the first input bus 110. Thus, the controller 116A and the switch 114A can limit inrush of the current 1200 (e.g., a current transient) upon power up.

The controllers 126B, 126C sense the reverse voltage and deactivate (e.g., open) the switches 124B, 124C, respectively, to provide reverse current protection to the second input power bus 120. The orientation of the diodes 122B, 122C also prevent a reverse current 1200 from the first input power bus 110 from flowing into the second input power bus 120. Thus, in FIG. 12, the current 1200 is provided to the load 130 via the first input power bus 110.

Figure 13:
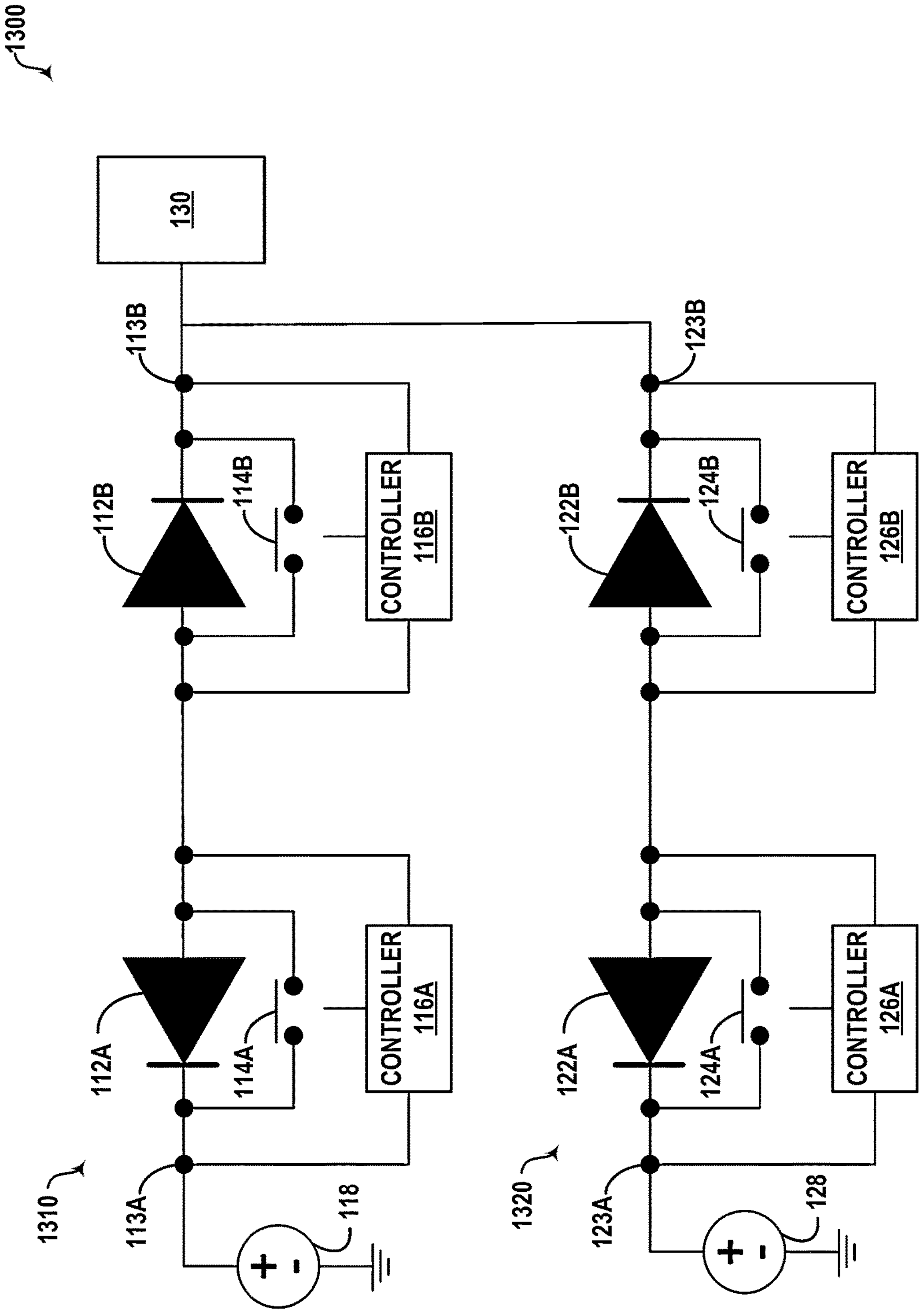
FIG. 13 illustrates another dual-input bus that provides power to a load, according to an exemplary embodiment.

Referring to FIG. 13, another dual-input bus 1300 that provides power to a load is illustrated, in accordance with an exemplary embodiment. For example, the dual-input bus 1300 (e.g., a dual-input power bus) includes a first input power bus 1310 and a second input power bus 1320. The first input power bus 1310 includes similar components as the first input power bus 110 and operates in a substantially similar manner. However, the first input power bus 1310 does not include the diode 112C, the switch 114C, or the controller 116C. The second input power bus 1320 includes similar components as the second input power bus 120 and operates in a substantially similar manner. However, the second input power bus 1320 does not include the diode 122C, the switch 124C, or the controller 126C.

In a similar manner as the dual-input bus 100, the dual-input bus 1300 provides a redundant dual-input power bus architecture that ensures adequate power is supplied to the load 130 under a plurality of different operating scenarios. For example, the architecture of the dual-input bus 1300 provides for physical and electrical isolation between power inputs to ensure that an adequate power signal (e.g., a current signal) is provided to the load 130 if different line diodes fail (e.g., short).

Figure 14:
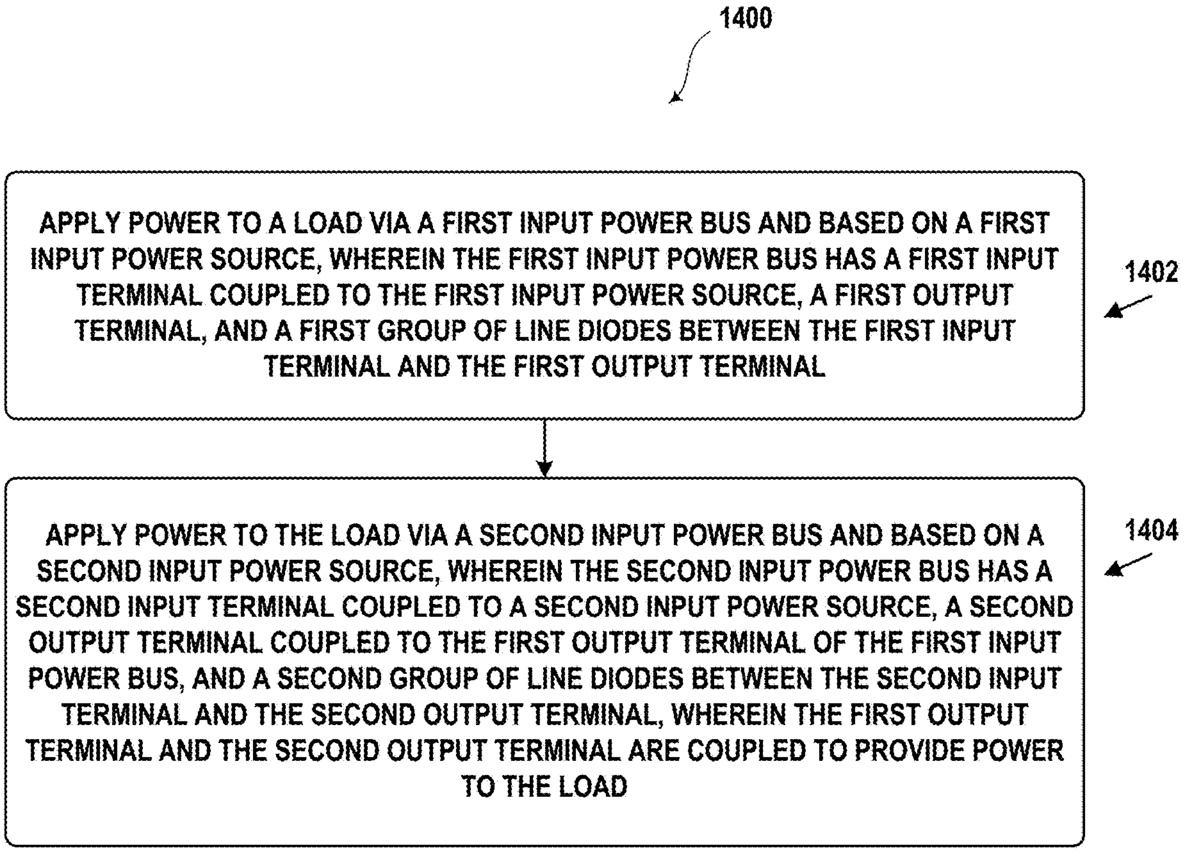
FIG. 14 is a flowchart of an example of an implementation of a method, according to an exemplary embodiment.

FIG. 14 illustrates a flow chart of a method 1400, according to an exemplary embodiment.

The method 1400 includes applying power to a load via a first input power bus and based on a first input power source, at block 1402. The first input power bus has a first input terminal coupled to the first input power source, a first output terminal, and a first group of line diodes between the first input terminal and the first output terminal.

The method 1400 also includes applying power to the load via a second input power bus and based on a second input power source, at block 1404. The second input power bus has a second input terminal coupled to a second input power source, a second output terminal coupled to the first output terminal of the first input power bus, and a second group of line diodes between the second input terminal and the second output terminal. The first output terminal and the second output terminal are coupled to provide power to the load.

The method 1400 of FIG. 14 provides a redundant dual-input power bus architecture that ensures adequate power is supplied to the load 130 under a plurality of different operating scenarios. For example, the method 1400 provides for physical and electrical isolation between power inputs to ensure that an adequate power signal (e.g., a current signal) is provided to the load 130 if different line diodes 112, 122 fail (e.g., short). In particular, as described in greater detail with respect to FIGS. 2-12, the diodes 112B, 112C, 122B, 122C provide reverse polarity protection at the front end of the load 130 in scenarios where different line diodes 112, 122 fail, and the diodes 112A, 122A provide inrush current protection, under voltage protection, and over voltage protection.

Although the systems are described herein with specific reference to aircraft systems or aerospace vehicles, in other embodiments, the system can be a vehicle other than an aircraft without departing from the essence of the present disclosure.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. An apparatus comprising:

a first input power bus having a first input terminal coupled to a first input power source, a first output terminal, and a first group of line diodes between the first input terminal and the first output terminal, the first group of line diodes comprising:

a first input diode having a cathode coupled to the first input terminal, wherein a first input switch associated with the first input diode is controllable by a first input controller that senses a voltage of the first input diode;

a first middle diode having an anode coupled to an anode of the first input diode; and a first output diode having a cathode coupled to the first output terminal, wherein a first output switch associated with the first output diode is controllable by a first output controller that senses a voltage across the first output diode, and wherein a cathode of the first middle diode is coupled to an anode of the first output diode; and a second input power bus having a second input terminal coupled to a second input power source, a second output terminal coupled to the first output terminal of the first input power bus, and a second group of line diodes between the second input terminal and the second output terminal, wherein the first output terminal and the second output terminal are coupled to provide power to a load, wherein the first group of line diodes are separated from the second group of line diodes, from the first input terminal to the first output terminal, and wherein the first group of line diodes are coupled to the second group of line diodes after the first output terminal and after the second output terminal.

2. The apparatus of claim 1, wherein the first input controller is configured to activate the first input switch in response to detecting a forward voltage.

3. The apparatus of claim 1, wherein the first input controller is configured to:

detect an overcurrent; and deactivate the first input switch in response to detecting the overcurrent.

4. The apparatus of claim 1, wherein the first input switch corresponds to a metal-oxide-semiconductor-field-effect transistor (MOSFET).

5. The apparatus of claim 1, wherein the first output diode and the first output switch are integrated into a metal-oxide-semiconductor-field-effect-transistor (MOSFET) ideal diode circuit.

6. The apparatus of claim 1, wherein the first output controller is configured to deactivate the first output switch in response to the voltage across the first output diode indicating a reverse voltage.

7. The apparatus of claim 1, wherein a first middle switch associated with the first middle diode is controllable by a first middle controller that senses a voltage across the first middle diode, wherein the first middle controller is configured to deactivate the first middle switch in response to the voltage across the first middle diode indicating a reverse voltage.

8. The apparatus of claim 7, wherein the first middle diode and the first middle switch are integrated into a metal-oxide-semiconductor-field-effect-transistor (MOSFET) ideal diode circuit.

9. The apparatus of claim 1, wherein the second group of line diodes comprises:

a second input diode having a cathode coupled to the second input terminal, wherein a second input switch associated with the second input diode is controllable by a second input controller that senses a voltage of the second input diode; and a second output diode having a cathode coupled to the second output terminal, wherein a second output switch associated with the second output diode is controllable by a second output controller that senses a voltage across the second output diode.

10. The apparatus of claim 9, wherein the second input controller is configured to activate the second input switch in response to detecting a forward voltage.

11. The apparatus of claim 9, wherein the second input controller is configured to:

detect an overcurrent; and deactivate the second input switch in response to detecting the overcurrent.

12. The apparatus of claim 9, wherein the second output diode and the second output switch are integrated into a metal-oxide-semiconductor-field-effect-transistor (MOSFET) ideal diode circuit.

13. The apparatus of claim 9, wherein the second output controller is configured to deactivate the second output switch in response to the voltage across the second output diode indicating a reverse voltage.

14. The apparatus of claim 9, wherein the second group of line diodes further comprises:

a second middle diode having an anode coupled to an anode of the second input diode and having a cathode coupled to an anode of the second output diode, wherein a second middle switch associated with the second middle diode is controllable by a second middle controller that senses a voltage across the second middle diode, wherein the second middle controller is configured to deactivate the second middle switch in response to the voltage across the second middle diode indicating a reverse voltage.

15. The apparatus of claim 14, wherein the second middle diode and the second middle switch are integrated into a metal-oxide-semiconductor-field-effect-transistor (MOSFET) ideal diode circuit.

16. The apparatus of claim 1, wherein the load corresponds to a power supply or a converter circuit.

17. An aircraft comprising:

a load; and a dual-input bus comprising:

a first input power bus having a first input terminal coupled to a first input power source, a first output terminal, and a first group of line diodes between the first input terminal and the first output terminal, the first group of line diodes comprising:

a first input diode having a cathode coupled to the first input terminal, wherein a first input switch associated with the first input diode is controllable by a first input controller that senses a voltage of the first input diode;

a first middle diode having an anode coupled to an anode of the first input diode; and a first output diode having a cathode coupled to the first output terminal, wherein a first output switch associated with the first output diode is controllable by a first output controller that senses a voltage across the first output diode, and wherein a cathode of the first middle diode is coupled to an anode of the first output diode; and a second input power bus having a second input terminal coupled to a second input power source, a second output terminal coupled to the first output terminal of the first input power bus, and a second group of line diodes between the second input terminal and the second output terminal, wherein the first output terminal and the second output terminal are coupled to provide power to the load, wherein the first group of line diodes are separated from the second group of line diodes, from the first input terminal to the first output terminal, and wherein the first group of line diodes are coupled to the second group of line diodes after the first output terminal and after the second output terminal.

18. The aircraft of claim 17, wherein the first input controller is configured to:

detect an overcurrent; and deactivate the first input switch in response to detecting the overcurrent.

19. The aircraft of claim 17, wherein the first output controller is configured to deactivate the first output switch in response to the voltage across the first output diode indicating a reverse voltage.

20. A method comprising:

applying power to a load via a first input power bus and based on a first input power source, wherein the first input power bus has a first input terminal coupled to the first input power source, a first output terminal, and a first group of line diodes between the first input terminal and the first output terminal, and wherein the first group of line diodes comprises:

a first input diode having a cathode coupled to the first input terminal, wherein a first input switch associated with the first input diode is controllable by a first input controller that senses a voltage of the first input diode;

a first middle diode having an anode coupled to an anode of the first input diode; and a first output diode having a cathode coupled to the first output terminal, wherein a first output switch associated with the first output diode is controllable by a first output controller that senses a voltage across the first output diode, and wherein a cathode of the first middle diode is coupled to an anode of the first output diode; and applying power to the load via a second input power bus and based on a second input power source, wherein the second input power bus has a second input terminal coupled to the second input power source, a second output terminal coupled to the first output terminal of the first input power bus, and a second group of line diodes between the second input terminal and the second output terminal, wherein the first output terminal and the second output terminal are coupled to provide power to the load, wherein the first group of line diodes are separated from the second group of line diodes, from the first input terminal to the first output terminal, and wherein the first group of line diodes are coupled to the second group of line diodes after the first output terminal and after the second output terminal.

* * * * *